(12) United States Patent
Xie et al.

(10) Patent No.: US 10,798,608 B2
(45) Date of Patent: Oct. 6, 2020

(54) MESSAGE PROCESSING METHOD AND APPARATUS

(71) Applicant: Huawei Technologies Co., Ltd., Shenzhen (CN)

(72) Inventors: Xinqian Xie, Beijing (CN); Zhiheng Guo, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,371

(22) Filed: Mar. 29, 2019

(65) Prior Publication Data

US 2019/0230553 A1 Jul. 25, 2019

Related U.S. Application Data

(63) Continuation of application No. PCT/CN2016/101084, filed on Sep. 30, 2016.

(51) Int. Cl.
*H04L 12/28* (2006.01)
*H04W 28/06* (2009.01)
(Continued)

(52) U.S. Cl.
CPC .......... *H04W 28/06* (2013.01); *H04B 7/0452* (2013.01); *H04L 5/0014* (2013.01);
(Continued)

(58) Field of Classification Search
CPC ....................................................... H04L 12/28
(Continued)

(56) References Cited

U.S. PATENT DOCUMENTS

2011/0300857 A1 12/2011 Kazmi et al.
2016/0029350 A1 1/2016 Kishiyama et al.
(Continued)

FOREIGN PATENT DOCUMENTS

CN 102405664 A 4/2012
CN 105790890 A 7/2016
(Continued)

OTHER PUBLICATIONS

"Discussion on candidate assistance information for signalling or blind detection," 3GPP TSG RAN WG1 Meeting #84bis, Nanjing, China, R1-164478, pp. 1-5, 3rd Generation Partnership Project, Valbonne, France (May 23-27, 2016).
(Continued)

*Primary Examiner* — Dang T Ton
(74) *Attorney, Agent, or Firm* — Leydig, Voit & Mayer, Ltd.

(57) ABSTRACT

Embodiments of the present disclosure provide a message processing method and apparatus. The method includes: determining a transmission type of information to be sent to a terminal device and a transmission parameter corresponding to the transmission type; and sending, to the terminal device, a notification message carrying an indication field, where the indication field is used to indicate the transmission type and the transmission parameter, so that the terminal device receives data based on the transmission type and the transmission parameter; and at least one state of the indication field indicates that the transmission type is a first multiuser superposition transmission type, or at least one state of the indication field indicates that the transmission type is a third multiuser superposition transmission type. Based on the message processing method and apparatus provided in the embodiments of the present disclosure, transmission efficiency of a system can be increased.

12 Claims, 2 Drawing Sheets

A base station determines a transmission type of information to be sent to a terminal device and a transmission parameter corresponding to the transmission type — 101

The base station sends, to the terminal device, a notification message carrying an indication field, where the indication field is used to indicate the transmission type and the transmission parameter, so that the terminal device receives data based on the transmission type and the transmission parameter; and at least one state of the indication field indicates that the transmission type is a first multiuser superposition transmission type, and at least one state of the indication field indicates that the transmission type is a third multiuser superposition transmission type — 102

(51) Int. Cl.
| | |
|---|---|
| *H04L 5/00* | (2006.01) |
| *H04W 52/34* | (2009.01) |
| *H04B 7/0452* | (2017.01) |
| *H04W 72/04* | (2009.01) |
| *H04W 72/08* | (2009.01) |
| *H04W 52/16* | (2009.01) |

(52) U.S. Cl.
CPC .......... *H04L 5/0026* (2013.01); *H04L 5/0053* (2013.01); *H04L 5/0091* (2013.01); *H04L 5/0094* (2013.01); *H04W 52/16* (2013.01); *H04W 52/346* (2013.01); *H04W 72/042* (2013.01); *H04W 72/046* (2013.01); *H04W 72/082* (2013.01); *H04L 5/0007* (2013.01)

(58) Field of Classification Search
USPC ........................................................ 370/329
See application file for complete search history.

(56) References Cited

U.S. PATENT DOCUMENTS

| | | | |
|---|---|---|---|
| 2016/0100390 A1 | | 4/2016 | Kuo |
| 2017/0331573 A1 | | 11/2017 | Li |
| 2019/0319692 A1* | | 10/2019 | Noh ..................... H04L 5/0048 |

FOREIGN PATENT DOCUMENTS

| | | |
|---|---|---|
| JP | 2014154962 A | 8/2014 |
| WO | 2016119240 A1 | 8/2016 |
| WO | 2016146073 A1 | 9/2016 |
| WO | 2017051660 A1 | 3/2017 |

OTHER PUBLICATIONS

"Discussion on signaling design for MUST," 3GPP TSG RAN WG1 Meeting #86, Gothenburg, Sweden, R1-166186, pp. 1-4, 3rd Generation Partnership Project, Valbonne, France (Aug. 22-26, 2016).

"On Network Assistance and Operation of MUST," 3GPP TSG-RAN WG1 Meeting #86 Gothenburg, Sweden, R1-167688, pp. 1-7, 3rd Generation Partnership Project, Valbonne, France (May 22-26, 2016).

"3rd Generation Partnership Project; Technical Specification Group Radio Access Network; Study on Downlink Multiuser Superposition Transmission (MUST) for LTE; (Release 13)," 3GPP TR 36.859 V1.0.1, pp. 1-47, 3rd Generation Partnership Project, Valbonne, France (Nov. 2015).

"3rd Generation Partnership Project; Technical Specification Group Radio Access Network; Evolved Universal Terrestrial Radio Access (E-UTRA); Radio Resource Control (RRC); Protocol specification(Release 13)," 3GPP TS 36.331 V13.2.0, pp. 1-623, 3rd Generation Partnership Project, Valbonne, France (Jun. 2016).

"3rd Generation Partnership Project; Technical Specification Group Radio Access Network; Evolved Universal Terrestrial Radio Access (E-UTRA); Multiplexing and channel coding(Release 14)," 3GPP TS 36.212 V14.0.0, pp. 1-148, 3rd Generation Partnership Project, Valbonne, France (Sep. 2016).

"3rd Generation Partnership Project; Technical Specification Group Radio Access Network; Evolved Universal Terrestrial Radio Access (E-UTRA); Physical channels and modulation(Release 14)," 3GPP TS 36.211 V14.0.0, pp. 1-170, 3rd Generation Partnership Project, Valbonne, France (Sep. 2016).

"3rd Generation Partnership Project; Technical Specification Group Radio Access Network; Evolved Universal Terrestrial Radio Access (E-UTRA); Physical layer procedures(Release 14)," 3GPP TS 36.213 V14.0.0, pp. 1-406, 3rd Generation Partnership Project, Valbonne, France (Sep. 2016).

"WF on MUST supported TMs," 3GPP TSG RAN WG1 Meeting #86, Gothenburg, Sweden, R1-168291, pp. 1-2, 3rd Generation Partnership Project, Valbonne, France (Aug. 22-26, 2016).

"On Scheduling Constraints for MUST Operation," 3GPP TSG RAN WG1 Meeting #86, Gothenburg, Sweden, R1-167513, pp. 1-3, 3rd Generation Partnership Project, Valbonne, France (Aug. 22-26, 2016).

* cited by examiner

MESSAGE PROCESSING METHOD AND APPARATUS

CROSS-REFERENCE TO RELATED APPLICATIONS

This application is a continuation of International Application No. PCT/CN2016/101084, filed on Sep. 30, 2016, the disclosure of which is hereby incorporated by reference in its entirety.

TECHNICAL FIELD

Embodiments of the present disclosure relate to computer technologies, and in particular, to a message processing method and apparatus.

BACKGROUND

In multiuser superposition transmission (MUST) communication in a Long Term Evolution (LTE)/Long Term Evolution Advanced (LTE-A) system, there are a plurality of MUST transmission types: In a first multiuser superposition transmission type (MUST Case 1), a base station serves two paired user terminals in a same spatial multiplexing transmission mode and allocates a same precoding vector to the two user terminals. In a second multiuser superposition transmission type (MUST Case 2), a base station serves two paired user terminals in a transmit diversity transmission mode. In a third multiuser superposition transmission type (MUST Case 3), a base station serves two paired user terminals in a same spatial multiplexing transmission mode and allocates different precoding vectors to the two user terminals. To enable a user equipment (UE) performing MUST transmission to correctly receive information, the base station needs to notify the user equipment of corresponding indication information.

In the prior art, a corresponding field is defined in downlink control information sent by the base station, and the field is used to carry the corresponding indication information. For the first multiuser superposition transmission type, the indication information includes two fields: a first field used to indicate whether there is interference, and a second field used to indicate a power ratio value. For the third multiuser superposition transmission type, the indication information includes three fields: a first field used to indicate whether there is interference, a second field used to indicate a modulation scheme of a paired user, and a third field used to indicate a precoding vector of the paired user.

However, in the prior art, because the fields of the first multiuser superposition transmission type and the third multiuser superposition transmission type are defined in the downlink control information sent by the base station, overheads of the downlink control information are relatively large, causing relatively low transmission efficiency of a system.

SUMMARY

Embodiments of the present disclosure provide a message processing method and apparatus, to resolve a technical problem in the prior art that signaling overheads are relatively large, causing relatively low transmission efficiency of a system.

According to a first aspect, an embodiment of the present disclosure provides a message processing method, the method is applied to a multiuser superposition transmission (MUST) system, and the method includes:

determining, by a base station, a transmission type of information to be sent to a terminal device and a transmission parameter corresponding to the transmission type; and sending, by the base station, a notification message carrying an indication field to the terminal device, where the indication field is used to indicate the transmission type and the transmission parameter, so that the terminal device receives data based on the transmission type and the transmission parameter; and at least one state of the indication field indicates that the transmission type is a first multiuser superposition transmission type, or at least one state of the indication field indicates that the transmission type is a third multiuser superposition transmission type.

In the message processing method provided in the first aspect, the transmission type of the information to be sent to the terminal device and the transmission parameter corresponding to the transmission type are determined; and the notification message carrying the indication field is sent to the terminal device, where the indication field is used to indicate the transmission type and the transmission parameter, so that the terminal device receives the data based on the transmission type and the transmission parameter; and at least one state of the indication field indicates that the transmission type is the first multiuser superposition transmission type, or at least one state of the indication field indicates that the transmission type is the third multiuser superposition transmission type. The indication field used to indicate the first multiuser superposition transmission type and used to indicate the third multiuser superposition transmission type is reused. Therefore, a need in the prior art to define, in downlink control information, both a field indicating the first multiuser superposition transmission type and a field indicating the third multiuser superposition transmission type, is eliminated, and control signaling overheads are reduced, thereby ensuring relatively high transmission efficiency of a system.

In a possible design, when the transmission type indicated by the indication field is the first multiuser superposition transmission type, the transmission parameter indicated by the indication field includes a power ratio of the terminal device to a paired terminal device.

In a possible design, the power ratio of the terminal device to the paired terminal device includes a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same; and the base station does not send signals to the paired terminal device on the second spatial layer.

In a possible design, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

In the message processing method provided in the foregoing possible designs, when the indication field indicates different transmission types, the indication field correspondingly indicates transmission parameters corresponding to the transmission types. Therefore, the indication field used to indicate the first multiuser superposition transmission type and used to indicate the third multiuser superposition transmission type may be reused. This avoids a need in the prior art to define, in the downlink control information, both a field indicating the first multiuser superposition transmission type and a field indicating the third multiuser superposition transmission type, so that control signaling overheads are reduced, thereby ensuring relatively high transmission efficiency of a system.

According to a second aspect, an embodiment of the present disclosure provides a message processing method, the method is applied to a multiuser superposition transmission (MUST) system, and the method includes:

receiving, by a terminal device, a notification message carrying an indication field from a base station, wherein the indication field is configured to indicate a transmission type and a transmission parameter of information to be sent from the base station to the terminal device; and at least one state of the indication field indicates that the transmission type is a first multiuser superposition transmission type, or at least one state of the indication field indicates that the transmission type is a third multiuser superposition transmission type;

obtaining, by the terminal device based on a preset correspondence between a value of the indication field and the transmission type and the transmission parameter, the transmission type and the transmission parameter that correspond to the value of the indication field; and receiving, by the terminal device, data based on the transmission type and the transmission parameter.

In the message processing method provided in the second aspect, the terminal device receives the notification message carrying an indication field from a base station, wherein the indication field is configured to indicate a transmission type and a transmission parameter of information to be sent from the base station to the terminal device, so that the terminal device receives the data based on the transmission type and the transmission parameter. At least one state of the indication field indicates that the transmission type is the first multiuser superposition transmission type, or at least one state of the indication field indicates that the transmission type is the third multiuser superposition transmission type. Because the indication field used to indicate the first multiuser superposition transmission type and used to indicate the third multiuser superposition transmission type is reused, a need in the prior art to define, in downlink control information, both a field indicating the first multiuser superposition transmission type and a field indicating the third multiuser superposition transmission type, is eliminated, and control signaling overheads are reduced, thereby ensuring relatively high transmission efficiency of a system.

In a possible design, when the transmission type indicated by the indication field is the first multiuser superposition transmission type, the transmission parameter indicated by the indication field includes a power ratio of the terminal device to a paired terminal device.

In a possible design, the power ratio of the terminal device to the paired terminal device includes a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same; and the base station does not send signals to the paired terminal device on the second spatial layer.

In a possible design, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

In the message processing method provided in the foregoing possible designs, when the indication field indicates different transmission types, the indication field correspondingly indicates transmission parameters corresponding to the transmission types. Therefore, the indication field used to indicate the first multiuser superposition transmission type and used to indicate the third multiuser superposition transmission type may be reused. This avoids a need in the prior art to define, in the downlink control information, both a field indicating the first multiuser superposition transmission type and a field indicating the third multiuser superposition transmission type, so that control signaling overheads are reduced, thereby ensuring relatively high transmission efficiency of a system.

According to a third aspect, an embodiment of the present disclosure provides a message processing apparatus, including:

a determining module, configured to determine a transmission type of information and a transmission parameter corresponding to the transmission type to be sent to a terminal device; and a sending module, configured to send a notification message carrying an indication field to the terminal device, where the indication field is used to indicate the transmission type and the transmission parameter, so that the terminal device receives data based on the transmission type and the transmission parameter; and at least one state of the indication field indicates that the transmission type is a first multiuser superposition transmission type, or at least one state of the indication field indicates that the transmission type is a third multiuser superposition transmission type.

In a possible design, when the transmission type indicated by the indication field is the first multiuser superposition transmission type, the transmission parameter indicated by the indication field includes a power ratio of the terminal device to a paired terminal device.

In a possible design, the power ratio of the terminal device to the paired terminal device includes a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same; and the base station does not send signals to the paired terminal device on the second spatial layer.

In a possible design, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

For beneficial effects of the message processing apparatus provided in the third aspect and the possible designs of the third aspect, refer to the beneficial effects of the first aspect and the possible designs of the first aspect, and details are not described herein again.

According to a fourth aspect, an embodiment of the present disclosure provides a message processing apparatus, including:

a receiving module, configured to receive a notification message carrying an indication field from a base station, wherein the indication field is configured to indicate a transmission type and a transmission parameter of information to be sent from the base station to the terminal device; and at least one state of the indication field indicates that the transmission type is a first multiuser superposition transmission type, or at least one state of the indication field indicates that the transmission type is a third multiuser superposition transmission type; and an obtaining module, configured to obtain, based on a preset correspondence between a value of the indication field and the transmission type and the transmission parameter, the transmission type and the transmission parameter that correspond to the value of the indication field, where the receiving module is further configured to receive data based on the transmission type and the transmission parameter.

In a possible design, when the transmission type indicated by the indication field is the first multiuser superposition transmission type, the transmission parameter indicated by the indication field includes a power ratio of the terminal device to a paired terminal device.

In a possible design, the power ratio of the terminal device to the paired terminal device includes a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same; and the base station does not send signals to the paired terminal device on the second spatial layer.

In a possible design, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

For beneficial effects of the message processing apparatus provided in the fourth aspect and the possible designs of the fourth aspect, refer to the beneficial effects of the second aspect and the possible designs of the second aspect, and details are not described herein again.

According to a fifth aspect, an embodiment of the present disclosure provides a base station, including:

a processor, configured to determine a transmission type of information to be sent to a terminal device and a transmission parameter corresponding to the transmission type; and a transmitter, configured to send a notification message carrying an indication field to the terminal device, where the indication field is used to indicate the transmission type and the transmission parameter, so that the terminal device receives data based on the transmission type and the transmission parameter; and at least one state of the indication field indicates that the transmission type is a first multiuser superposition transmission type, or at least one state of the indication field indicates that the transmission type is a third multiuser superposition transmission type.

In a possible design, when the transmission type indicated by the indication field is the first multiuser superposition transmission type, the transmission parameter indicated by the indication field includes a power ratio of the terminal device to a paired terminal device.

In a possible design, the power ratio of the terminal device to the paired terminal device includes a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same; and the base station does not send signals to the paired terminal device on the second spatial layer.

In a possible design, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

For beneficial effects of the base station provided in the fifth aspect and the possible designs of the fifth aspect, refer to the beneficial effects of the first aspect and the possible designs of the first aspect, and details are not described herein again.

According to a sixth aspect, an embodiment of the present disclosure provides a terminal device, including:

a receiver, configured to receive a notification message carrying an indication field from a base station, wherein the indication field is configured to indicate a transmission type and a transmission parameter of information to be sent from the base station to the terminal device; and at least one state of the indication field indicates that the transmission type is a first multiuser superposition transmission type, or at least one state of the indication field indicates that the transmission type is a third multiuser superposition transmission type; and a processor, configured to obtain, based on a preset correspondence between a value of the indication field and the transmission type and the transmission parameter, the transmission type and the transmission parameter that correspond to the value of the indication field, where the receiver is further configured to receive data based on the transmission type and the transmission parameter.

In a possible design, when the transmission type indicated by the indication field is the first multiuser superposition transmission type, the transmission parameter indicated by the indication field includes a power ratio of the terminal device to a paired terminal device.

In a possible design, the power ratio of the terminal device to the paired terminal device includes a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same; and the base station does not send signals to the paired terminal device on the second spatial layer.

In a possible design, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

For beneficial effects of the terminal device provided in the sixth aspect and the possible designs of the sixth aspect, refer to the beneficial effects of the second aspect and the possible designs of the second aspect, and details are not described herein again.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
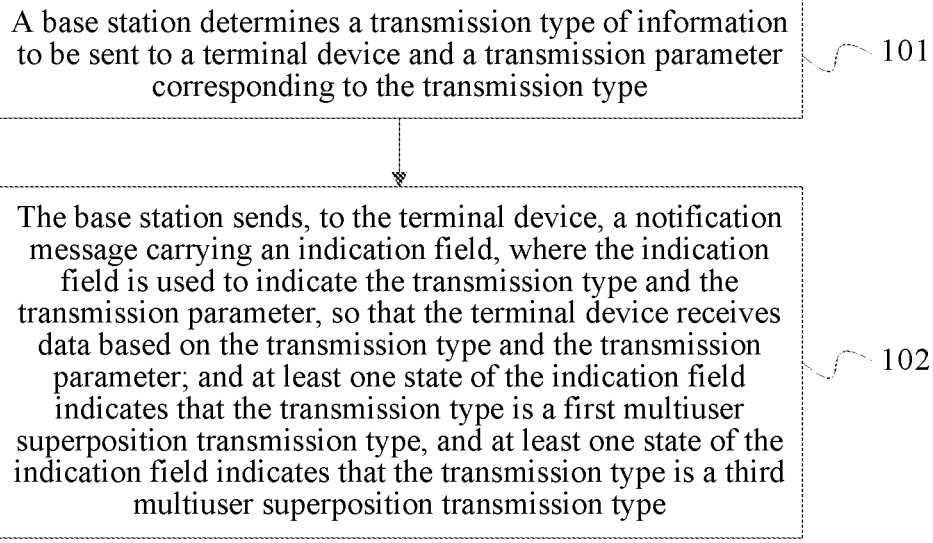
FIG. 1 is a schematic flowchart of Embodiment 1 of a message processing method according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A message processing method used in embodiments of the present disclosure may be applied to MUST communication in an LTE/LTE-A system. In the MUST communication, there are a plurality of MUST transmission types: In a first multiuser superposition transmission type, a base station serves two paired user terminals in a same spatial multiplexing transmission mode and allocates a same precoding vector to the two user terminals. In a third multiuser superposition transmission type, a base station serves two paired user terminals in a same spatial multiplexing transmission mode and allocates different precoding vectors to the two user terminals. To enable a terminal device performing MUST transmission to correctly receive information, the base station needs to notify the terminal device of a transmission parameter corresponding to a transmission type. In the prior art, the base station may define a corresponding field in sent downlink control information, and the field is used to carry the transmission parameter. For the first multiuser superposition transmission type, indication information includes two fields: a first field used to indicate whether there is interference, and a second field used to indicate a power ratio value. For the third multiuser superposition transmission type, three fields may be additionally defined in the indication information: a first field used to indicate whether there is interference, a second field used to indicate a modulation scheme of a paired user, and a third field used to indicate a precoding vector of the paired user. In this way, a plurality of fields need to be used in the downlink control information to indicate transmission types and transmission parameters corresponding to the transmission types, causing very large overheads of the downlink control information.

Therefore, the message processing method and a message processing apparatus provided in the embodiments of the present disclosure are intended to resolve a technical problem in the prior art that overheads of the downlink control information are relatively large, causing relatively low transmission efficiency of a system.

The technical solutions in the present disclosure are described in detail below by using specific embodiments. The several specific embodiments below may be combined with each other, and for a same or similar concept or process, details may not be described in some embodiments.

FIG. 1 is a schematic flowchart of Embodiment 1 of a message processing method according to the present disclosure. This embodiment of the present disclosure provides a message processing method, the method may be performed by any apparatus configured to perform a message processing method, and the apparatus may be implemented by software and/or hardware. In this embodiment, the apparatus may be integrated into a base station. As shown in FIG. 1, the method in this embodiment may include the following steps:

Step 101. A base station determines a transmission type of information to be sent to a terminal device and a transmission parameter corresponding to the transmission type.

Step 102. The base station sends, to the terminal device, a notification message carrying an indication field, where the indication field is used to indicate the transmission type and the transmission parameter, so that the terminal device receives data based on the transmission type and the transmission parameter; and at least one state of the indication field indicates that the transmission type is a first multiuser superposition transmission type, or at least one state of the indication field indicates that the transmission type is a third multiuser superposition transmission type.

In this embodiment, after determining the transmission type of the information to be sent to the terminal device and the transmission parameter corresponding to the transmission type, the base station sends, to the terminal device, the notification message carrying the indication field. At least one state of the indication field may indicate that the transmission type is the first multiuser superposition transmission type, or at least one state of the indication field may alternatively indicate that the transmission type is the third multiuser superposition transmission type. After receiving the notification message that carries the indication field and that is sent by the base station, the terminal device receives data based on the transmission type and the transmission parameter that are indicated by the indication field.

It should be noted that the notification message may carry the indication field in an explicit manner, or may carry the indication field in an implicit manner. For example, the notification message carries the indication field in a scrambled manner.

In addition, the indication field may further include at least two parts. In this embodiment, two parts are used as an example for description. A first part is used to indicate a first multiuser superposition transmission type and a corresponding transmission parameter, and a second part is used to indicate a second multiuser superposition transmission type and a corresponding transmission parameter.

Specifically, when the base station transmits data for the terminal device by using a spatial multiplexing transmission mode whose rank is 2, the transmission type indicated by the indication field may include single-user transmission and the first multiuser superposition transmission type. When the base station transmits data for the terminal device in a spatial multiplexing transmission mode whose rank is 1, the transmission type indicated by the indication field includes single-user transmission, the first multiuser superposition transmission type, and the third multiuser superposition transmission type.

Optionally, when the transmission type indicated by the indication field is the first multiuser superposition transmission type, the transmission parameter indicated by the indication field includes a power ratio of the terminal device to a paired terminal device.

Specifically, when the base station sends signals to the terminal device in a spatial multiplexing transmission mode whose rank is 2 and sends signals to the terminal device in a spatial multiplexing transmission mode whose rank is 1, the power ratio of the terminal device to the paired terminal device is a ratio of a power of a first signal sent from the base station to the terminal device on a first spatial layer to a power of a second signal sent from the base station to the paired terminal device on the first spatial layer. In addition, powers of signals sent from the base station to the terminal device on the first spatial layer and a second spatial layer are the same, and the base station does not send signals to the paired terminal device on the second spatial layer. The first signal is a signal needed by the terminal device, and the second signal is a signal needed by the paired terminal device.

For ease of understanding, if the first signal sent by the base station to the terminal device on the first spatial layer is represented by x, the signal sent by the base station to the terminal device on the second spatial layer is represented by y, and the second signal sent by the base station to the paired terminal device on the first spatial layer is represented by z, the powers of x and y are the same.

Optionally, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

Specifically, when the transmission type indicated by the indication field is the third multiuser superposition transmission type, and the indicated transmission parameter includes the precoding information of the paired terminal device, a correspondence between a value of the indication field and the transmission type and the transmission parameter is shown in Table 1. In addition, the indication field indicates that a quantity of power ratio values corresponding to the first multiuser superposition transmission type is not limited to four, and the indication field indicates that a quantity of pieces of precoding information corresponding to the third multiuser superposition transmission type is not limited to three.

TABLE 1

| Value of an indication field | Transmission type | Transmission parameter |
| --- | --- | --- |
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |
| 5 | Third multiuser superposition transmission type | First precoding information |

TABLE 1-continued

| Value of an indication field | Transmission type | Transmission parameter |
| --- | --- | --- |
| 6 | Third multiuser superposition transmission type | Second precoding information |
| 7 | Third multiuser superposition transmission type | Third precoding information |

It should be noted that precoding information of the terminal device and the paired terminal device may be indicated in a joint indication manner.

When the transmission type indicated by the indication field is the third multiuser superposition transmission type, and the indicated transmission parameter includes the modulation scheme of the paired terminal device, a correspondence between a value of the indication field and the transmission type and the transmission parameter is shown in Table 2. In addition, the indication field indicates that a quantity of power ratio values corresponding to the first multiuser superposition transmission type is not limited to four, and the indication field indicates that a quantity of modulation schemes corresponding to the third multiuser superposition transmission type is not limited to three.

TABLE 2

| Value of an indication field | Transmission type | Transmission parameter |
| --- | --- | --- |
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |
| 5 | Third multiuser superposition transmission type | First modulation scheme |
| 6 | Third multiuser superposition transmission type | Second modulation scheme |
| 7 | Third multiuser superposition transmission type | Third modulation scheme |

When the transmission type indicated by the indication field is the third multiuser superposition transmission type, and the indicated transmission parameter includes the precoding information of the paired terminal device and the modulation scheme of the paired terminal device, a correspondence between a value of the indication field and the transmission type and the transmission parameter is shown in Table 3. In addition, the indication field indicates that a quantity of power ratio values corresponding to the first multiuser superposition transmission type is not limited to four, and the indication field indicates that a quantity of combinations of pieces of precoding information of the paired terminal device and modulation schemes of the paired terminal device that correspond to the third multiuser superposition transmission type is not limited to nine.

TABLE 3

| Value of an indication field | Transmission type | Transmission parameter |
|---|---|---|
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |
| 5 | Third multiuser superposition transmission type | First precoding information and first modulation scheme |
| 6 | Third multiuser superposition transmission type | First precoding information and second modulation scheme |
| 7 | Third multiuser superposition transmission type | First precoding information and third modulation scheme |
| 8 | Third multiuser superposition transmission type | Second precoding information and first modulation scheme |
| 9 | Third multiuser superposition transmission type | Second precoding information and second modulation scheme |
| 10 | Third multiuser superposition transmission type | Second precoding information and third modulation scheme |
| 11 | Third multiuser superposition transmission type | Third precoding information and first modulation scheme |
| 12 | Third multiuser superposition transmission type | Third precoding information and second modulation scheme |
| 13 | Third multiuser superposition transmission type | Third precoding information and third modulation scheme |

When the transmission type indicated by the indication field is the third multiuser superposition transmission type, and the indicated transmission parameter includes the power ratio of the terminal device to the paired terminal device, a correspondence between a value of the indication field and the transmission type and the transmission parameter is shown in Table 4. In addition, the indication field indicates that a quantity of power ratio values corresponding to the first multiuser superposition transmission type is not limited to four, and the indication field indicates that a quantity of power ratios of the terminal device to the paired terminal device that correspond to the third multiuser superposition transmission type is not limited to three.

TABLE 4

| Value of an indication field | Transmission type | Transmission parameter |
|---|---|---|
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |
| 5 | Third multiuser superposition transmission type | First power ratio value |
| 6 | Third multiuser superposition transmission type | Second power ratio value |
| 7 | Third multiuser superposition transmission type | Third power ratio value |

When the transmission type indicated by the indication field is the third multiuser superposition transmission type, and the indicated transmission parameter includes the modulation scheme of the paired terminal device and the power ratio of the terminal device to the paired terminal device, a correspondence between a value of the indication field and the transmission type and the transmission parameter is shown in Table 5. In addition, the indication field indicates that a quantity of power ratio values corresponding to the first multiuser superposition transmission type is not limited to four, and the indication field indicates that a quantity of combinations of modulation schemes of the paired terminal device and power ratios of the terminal device to the paired terminal device that correspond to the third multiuser superposition transmission type is not limited to nine.

TABLE 5

| Value of an indication field | Transmission type | Transmission parameter |
|---|---|---|
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |
| 5 | Third multiuser superposition transmission type | First modulation scheme and first power ratio value |
| 6 | Third multiuser superposition transmission type | First modulation scheme and second power ratio value |
| 7 | Third multiuser superposition transmission type | First modulation scheme and third power ratio value |
| 8 | Third multiuser superposition transmission type | Second modulation scheme and first power ratio value |
| 9 | Third multiuser superposition transmission type | Second modulation scheme and second power ratio value |
| 10 | Third multiuser superposition transmission type | Second modulation scheme and third power ratio value |
| 11 | Third multiuser superposition transmission type | Third modulation scheme and first power ratio value |
| 12 | Third multiuser superposition transmission type | Third modulation scheme and second power ratio value |
| 13 | Third multiuser superposition transmission type | Third modulation scheme and third power ratio value |

When the transmission type indicated by the indication field is the third multiuser superposition transmission type, and the indicated transmission parameter includes the precoding information of the paired terminal device and the power ratio of the terminal device to the paired terminal device, a correspondence between a value of the indication field and the transmission type and the transmission parameter is shown in Table 6. In addition, the indication field indicates that a quantity of power ratio values corresponding to the first multiuser superposition transmission type is not limited to four, and the indication field indicates that a quantity of combinations of pieces of precoding information of the paired terminal device and power ratios of the terminal device to the paired terminal device that correspond to the third multiuser superposition transmission type is not limited to nine.

TABLE 6

| Value of an indication field | Transmission type | Transmission parameter |
|---|---|---|
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |
| 5 | Third multiuser superposition transmission type | First precoding information and first power ratio value |
| 6 | Third multiuser superposition transmission type | First precoding information and second power ratio value |
| 7 | Third multiuser superposition transmission type | First precoding information and third power ratio value |
| 8 | Third multiuser superposition transmission type | Second precoding information and first power ratio value |
| 9 | Third multiuser superposition transmission type | Second precoding information and second power ratio value |
| 10 | Third multiuser superposition transmission type | Second precoding information and third power ratio value |
| 11 | Third multiuser superposition transmission type | Third precoding information and first power ratio value |
| 12 | Third multiuser superposition transmission type | Third precoding information and second power ratio value |
| 13 | Third multiuser superposition transmission type | Third precoding information and third power ratio value |

When the transmission type indicated by the indication field is the third multiuser superposition transmission type, and the indicated transmission parameter includes the modulation scheme of the paired terminal device, the precoding information of the paired terminal device, and the power ratio of the terminal device to the paired terminal device, a correspondence between a value of the indication field and the transmission type and the transmission parameter is shown in Table 7. In addition, the indication field indicates that a quantity of power ratio values corresponding to the first multiuser superposition transmission type is not limited to four, and the indication field indicates that a quantity of combinations of modulation schemes of the paired terminal device and power ratios of the terminal device to the paired terminal device that correspond to the third multiuser superposition transmission type is not limited to 27.

TABLE 7

| Value of an indication field | Transmission type | Transmission parameter |
|---|---|---|
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |
| 5 | Third multiuser superposition transmission type | First modulation scheme, first precoding information, and first power ratio value |
| 6 | Third multiuser superposition transmission type | First modulation scheme, first precoding information, and second power ratio value |
| 7 | Third multiuser superposition transmission type | First modulation scheme, first precoding information, and third power ratio value |
| 8 | Third multiuser superposition transmission type | Second modulation scheme, first precoding information, and first power ratio value |
| 9 | Third multiuser superposition transmission type | Second modulation scheme, first precoding information, and second power ratio value |
| 10 | Third multiuser superposition transmission type | Second modulation scheme, first precoding information, and third power ratio value |
| 11 | Third multiuser superposition transmission type | Third modulation scheme, first precoding information, and first power ratio value |
| 12 | Third multiuser superposition transmission type | Third modulation scheme, first precoding information, and second power ratio value |
| 13 | Third multiuser superposition transmission type | Third modulation scheme, first precoding information, and third power ratio value |
| 14 | Third multiuser superposition transmission type | First modulation scheme, second precoding information, and first power ratio value |
| 15 | Third multiuser superposition transmission type | First modulation scheme, second precoding information, and second power ratio value |
| 16 | Third multiuser superposition transmission type | First modulation scheme, second precoding information, and third power ratio value |
| 17 | Third multiuser superposition transmission type | Second modulation scheme, second precoding information, and first power ratio value |
| 18 | Third multiuser superposition transmission type | Second modulation scheme, second precoding information, and second power ratio value |
| 19 | Third multiuser superposition transmission type | Second modulation scheme, second precoding information, and third power ratio value |
| 20 | Third multiuser superposition transmission type | Third modulation scheme, second precoding information, and first power ratio value |
| 21 | Third multiuser superposition transmission type | Third modulation scheme, second precoding information, and second power ratio value |
| 22 | Third multiuser superposition transmission type | Third modulation scheme, second precoding information, and third power ratio value |
| 23 | Third multiuser superposition transmission type | First modulation scheme, third precoding information, and first power ratio value |
| 24 | Third multiuser superposition transmission type | First modulation scheme, third precoding information, and second power ratio value |
| 25 | Third multiuser superposition transmission type | First modulation scheme, third precoding information, and third power ratio value |
| 26 | Third multiuser superposition transmission type | Second modulation scheme, third precoding information, and first power ratio value |
| 27 | Third multiuser superposition transmission type | Second modulation scheme, third precoding information, and second power ratio value |

TABLE 7-continued

| Value of an indication field | Transmission type | Transmission parameter |
|---|---|---|
| 28 | Third multiuser superposition transmission type | Second modulation scheme, third precoding information, and third power ratio value |
| 29 | Third multiuser superposition transmission type | Third modulation scheme, third precoding information, and first power ratio value |
| 30 | Third multiuser superposition transmission type | Third modulation scheme, third precoding information, and second power ratio value |
| 31 | Third multiuser superposition transmission type | Third modulation scheme, third precoding information, and third power ratio value |

In addition, when the base station uses a spatial multiplexing transmission mode whose rank is 2, the indication field may be divided into two subfields, and a correspondence between a value of each subfield and the transmission type and the transmission parameter is shown in Table 8. A first subfield indicates content of first-layer information, a second subfield indicates content of second-layer information, and correspondences between values of the two subfields and the transmission type and the transmission parameter are the same. In addition, the subfields in the indication field indicate that a quantity of power ratio values corresponding to the first multiuser superposition transmission type is not limited to four.

TABLE 8

| Value of a subfield in an indication field | Transmission type | Transmission parameter |
|---|---|---|
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |

After receiving the notification message that carries the indication field and that is sent by the base station, the terminal device obtains, based on a locally-stored correspondence between a value of the indication field and the transmission type and the transmission parameter, a transmission type and a transmission parameter that correspond to the value of the indication field. During specific implementation, the transmission type and the transmission parameter may be obtained by querying the correspondences in Table 1 to Table 5. The base station sends, to the terminal device, the notification message carrying the indication field, at least one state of the indication field indicates that the transmission type is the first multiuser superposition transmission type, or at least one state of the indication field indicates that the transmission type is the third multiuser superposition transmission type. That is, the indication field used to indicate the first multiuser superposition transmission type and used to indicate the third multiuser superposition transmission type is reused. Therefore, a need in the prior art to define, in the downlink control information, both a field indicating the first multiuser superposition transmission type and a field indicating the third multiuser superposition transmission type, is eliminated, and control signaling overheads are reduced, thereby ensuring relatively high transmission efficiency of a system.

Optionally, the base station may further configure the transmission type for the terminal device by using high layer signaling. When the base station configures the first multiuser superposition transmission type for the terminal device, a correspondence between a value of the indication field and the transmission type and the transmission parameter is shown in Table 9. In addition, the indication field indicates that a quantity of power ratio values corresponding to the first multiuser superposition transmission type is not limited to four.

TABLE 9

| Value of an indication field | Transmission type | Transmission parameter |
|---|---|---|
| 0 | Single-user | / |
| 1 | First multiuser superposition transmission type | First power ratio value |
| 2 | First multiuser superposition transmission type | Second power ratio value |
| 3 | First multiuser superposition transmission type | Third power ratio value |
| 4 | First multiuser superposition transmission type | Fourth power ratio value |

When the transmission type indicated by the indication field is the third multiuser superposition transmission type, and the indicated transmission parameter includes the precoding information of the paired terminal device, a correspondence between a value of the indication field and the transmission type and the transmission parameter is shown in Table 10. In addition, the indication field indicates that a quantity of pieces of precoding information corresponding to the third multiuser superposition transmission type is not limited to three.

TABLE 10

| Value of an indication field | Transmission type | Transmission parameter |
|---|---|---|
| 0 | Single-user | / |
| 1 | Third multiuser superposition transmission type | First precoding information |
| 2 | Third multiuser superposition transmission type | Second precoding information |
| 3 | Third multiuser superposition transmission type | Third precoding information |

When the transmission type indicated by the indication field is the third multiuser superposition transmission type, and the indicated transmission parameter includes the modulation scheme of the paired terminal device, a correspondence between a value of the indication field and the transmission type and the transmission parameter is shown in Table 11. In addition, the indication field indicates that a quantity of modulation schemes corresponding to the third multiuser superposition transmission type is not limited to three.

TABLE 11

| Value of an indication field | Transmission type | Transmission parameter |
|---|---|---|
| 0 | Single-user | / |
| 1 | Third multiuser superposition transmission type | First modulation scheme |
| 2 | Third multiuser superposition transmission type | Second modulation scheme |
| 3 | Third multiuser superposition transmission type | Third modulation scheme |

When the transmission type indicated by the indication field is the third multiuser superposition transmission type, and the indicated transmission parameter includes the precoding information of the paired terminal device and the modulation scheme of the paired terminal device, a correspondence between a value of the indication field and the transmission type and the transmission parameter is shown in Table 12. In addition, the indication field indicates that a quantity of combinations of pieces of precoding information and modulation schemes that correspond to the third multiuser superposition transmission type is not limited to nine.

TABLE 12

| Value of an indication field | Transmission type | Transmission parameter |
|---|---|---|
| 0 | Single-user | / |
| 1 | Third multiuser superposition transmission type | First precoding information and first modulation scheme |
| 2 | Third multiuser superposition transmission type | First precoding information and second modulation scheme |
| 3 | Third multiuser superposition transmission type | First precoding information and third modulation scheme |
| 4 | Third multiuser superposition transmission type | Second precoding information and first modulation scheme |
| 5 | Third multiuser superposition transmission type | Second precoding information and second modulation scheme |
| 6 | Third multiuser superposition transmission type | Second precoding information and third modulation scheme |
| 7 | Third multiuser superposition transmission type | Third precoding information and first modulation scheme |
| 8 | Third multiuser superposition transmission type | Third precoding information and second modulation scheme |
| 9 | Third multiuser superposition transmission type | Third precoding information and third modulation scheme |

After receiving the notification message that carries the indication field and that is sent by the base station, the terminal device obtains, based on a locally-stored correspondence between a value of the indication field and the transmission type and the transmission parameter, a transmission type and a transmission parameter that correspond to the value of the indication field. During specific implementation, the transmission type and the transmission parameter may be obtained by querying the correspondences in Table 6 to Table 9. The base station sends the notification message carrying the indication field to the terminal device, at least one state of the indication field indicates that the transmission type is the first multiuser superposition transmission type, or at least one state of the indication field indicates that the transmission type is the third multiuser superposition transmission type. That is, the indication field used to indicate the first multiuser superposition transmission type and used to indicate the third multiuser superposition transmission type is reused. Therefore, a need in the prior art to define, in the downlink control information, both a field indicating the first multiuser superposition transmission type and a field indicating the third multiuser superposition transmission type, is eliminated, and control signaling overheads are reduced, thereby ensuring relatively high transmission efficiency of a system.

Based on the message processing method and apparatus provided in the embodiments of the present disclosure, the transmission type of the information to be sent to the terminal device and the transmission parameter corresponding to the transmission type are determined; and the notification message carrying the indication field is sent to the terminal device, where the indication field is used to indicate the transmission type and the transmission parameter, so that the terminal device receives the data based on the transmission type and the transmission parameter; and at least one state of the indication field indicates that the transmission type is the first multiuser superposition transmission type, or at least one state of the indication field indicates that the transmission type is the third multiuser superposition transmission type. Because the indication field used to indicate the first multiuser superposition transmission type and used to indicate the third multiuser superposition transmission type is reused, a need in the prior art to define, in the downlink control information, both a field indicating the first multiuser superposition transmission type and a field indicating the third multiuser superposition transmission type, is eliminated, and control signaling overheads are reduced, thereby ensuring relatively high transmission efficiency of a system.

Persons of ordinary skill in the art may understand that all or some of the steps of the foregoing method embodiment may be implemented by a program instructing relevant hardware. The program may be stored in a computer readable storage medium. When the program runs, the steps of the foregoing method embodiment are performed. The foregoing storage medium includes: any medium that can store program code, such as a ROM, a RAM, a magnetic disk, or a compact disc.

Figure 2:
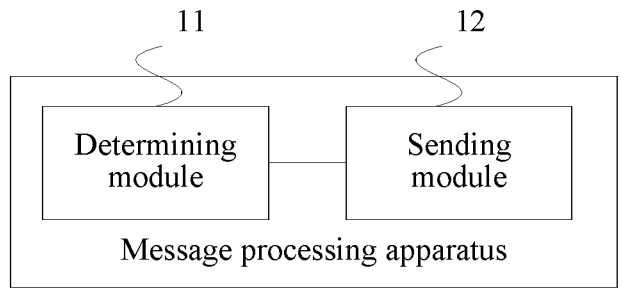
FIG. 2 is a schematic structural diagram of Embodiment 1 of a message processing apparatus according to embodiments of the present disclosure.

FIG. 2 is a schematic structural diagram of Embodiment 1 of a message processing apparatus according to the embodiments of the present disclosure. The processing apparatus may be an independent base station or may be an apparatus integrated into a base station, and the apparatus may be implemented in a form of software, hardware, or a combination of software and hardware. As shown in FIG. 2, the processing apparatus includes:

a determining module 11, configured to determine a transmission type of information and a transmission parameter corresponding to the transmission type to be sent to a terminal device; and a sending module 12, configured to send a notification message carrying an indication field to the terminal device, where the indication field is used to indicate the transmission type and the transmission parameter, so that the terminal device receives data based on the transmission type and the transmission parameter; and at least one state of the indication field indicates that the transmission type is a first multiuser superposition transmission type, or at least one state of the indication field indicates that the transmission type is a third multiuser superposition transmission type.

Optionally, the determining module 11 may be correspondingly a processor in the base station, and the sending module 12 may be a transmitter in the base station. Alternatively, the sending module 12 may further integrate some functions of the processor.

The message processing apparatus provided in this embodiment of the present disclosure may perform the foregoing method embodiment. Their implementation principles and technical effects are similar, and details are not described herein again.

Optionally, when the transmission type indicated by the indication field is the first multiuser superposition transmission type, the transmission parameter indicated by the indication field includes a power ratio of the terminal device to a paired terminal device.

Optionally, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

The message processing apparatus provided in this embodiment of the present disclosure may perform the foregoing method embodiment. Their implementation principles and technical effects are similar, and details are not described herein again.

Figure 3:
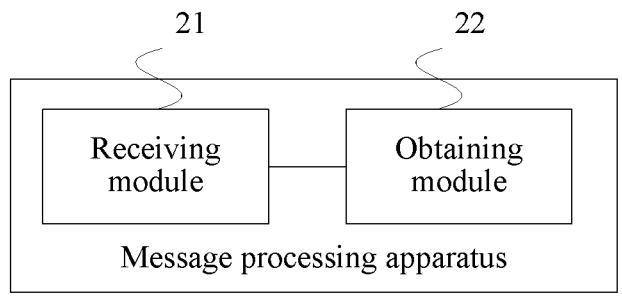
FIG. 3 is a schematic structural diagram of Embodiment 2 of a message processing apparatus according to embodiments of the present disclosure.

FIG. 3 is a schematic structural diagram of Embodiment 2 of a message processing apparatus according to the embodiments of the present disclosure. The processing apparatus may be an independent terminal device or may be an apparatus integrated into a terminal device, and the apparatus may be implemented in a form of software, hardware, or a combination of software and hardware. As shown in FIG. 3, the processing apparatus includes:

a receiving module 21, configured to receive a notification message that carries an indication field and that is sent by a base station, where the indication field is used to indicate a transmission type and a transmission parameter of information to be sent by the base station to the terminal device; and at least one state of the indication field indicates that the transmission type is a first multiuser superposition transmission type, and at least one state of the indication field indicates that the transmission type is a third multiuser superposition transmission type; and an obtaining module 22, configured to obtain, based on a preset correspondence between a value of the indication field and the transmission type and the transmission parameter, the transmission type and the transmission parameter that correspond to the value of the indication field, where the receiving module 21 is further configured to receive data based on the transmission type and the transmission parameter.

Optionally, the receiving module 21 may be correspondingly a receiver in the terminal device, and the obtaining module 22 may be a processor in the terminal device. Alternatively, the receiving module 21 may further integrate some functions of the processor.

The message processing apparatus provided in this embodiment of the present disclosure may perform the foregoing method embodiment. Their implementation principles and technical effects are similar, and details are not described herein again.

Optionally, when the transmission type indicated by the indication field is the first multiuser superposition transmission type, the transmission parameter indicated by the indication field includes a power ratio of the terminal device to a paired terminal device.

Optionally, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

The message processing apparatus provided in this embodiment of the present disclosure may perform the foregoing method embodiment. Their implementation principles and technical effects are similar, and details are not described herein again.

Figure 4:
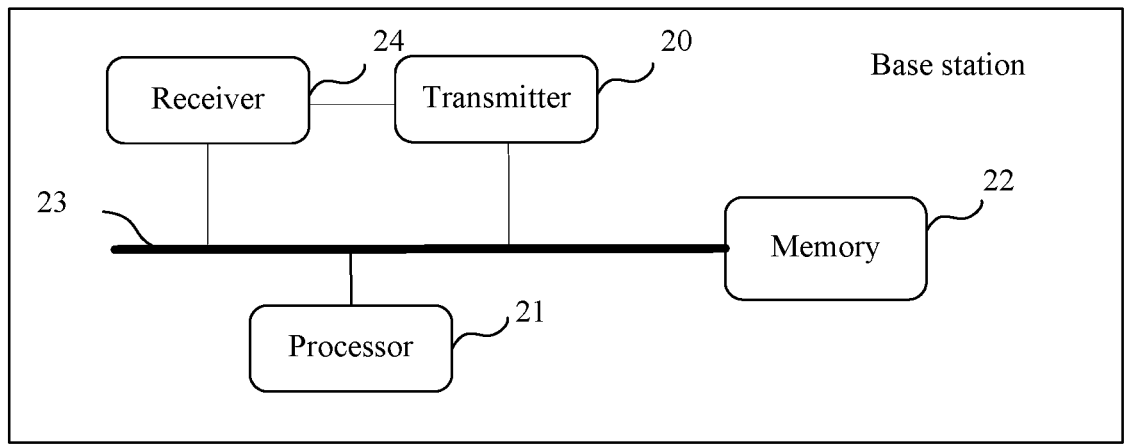
FIG. 4 is a schematic structural diagram of an embodiment of a base station according to embodiments of the present disclosure.

FIG. 4 is a schematic structural diagram of an embodiment of a base station according to the embodiments of the present disclosure. As shown in FIG. 4, the base station may include a transmitter 20, a processor 21, a memory 22, and at least one communications bus 23. The communications bus 23 is configured to implement communication connection between the elements. The memory 22 may include a high-speed RAM 22, and may further include a nonvolatile memory NVM, for example, at least one magnetic disk storage 22. The memory 22 may store various programs to complete various processing functions and implement method steps in this embodiment. Optionally, the base station may further include a receiver 24. The receiver 24 in this embodiment may be an input interface that correspondingly has a communication function and an information receiving function, or may be a radio frequency module or a baseband module on the base station. The transmitter 20 in this embodiment may be an output interface that correspondingly has a communication function and an information sending function, or may be a radio frequency module or a baseband module on the base station. Optionally, the transmitter 20 and the receiver 24 may be integrated into one communications interface, or may be two independent communications interfaces.

In this embodiment, the processor 21 is configured to determine a transmission type of information to be sent to a terminal device and a transmission parameter corresponding to the transmission type; and the transmitter 20 is configured to send, to the terminal device, a notification message carrying an indication field, where the indication field is used to indicate the transmission type and the transmission parameter, so that the terminal device receives data based on the transmission type and the transmission parameter; and at least one state of the indication field indicates that the transmission type is a first multiuser superposition transmission type, and at least one state of the indication field indicates that the transmission type is a third multiuser superposition transmission type.

Optionally, when the transmission type indicated by the indication field is the first multiuser superposition transmission type, the transmission parameter indicated by the indication field includes a power ratio of the terminal device to a paired terminal device.

Optionally, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

The base station provided in this embodiment of the present disclosure may perform the foregoing method embodiment. Their implementation principles and technical effects are similar, and details are not described herein again.

Figure 5:
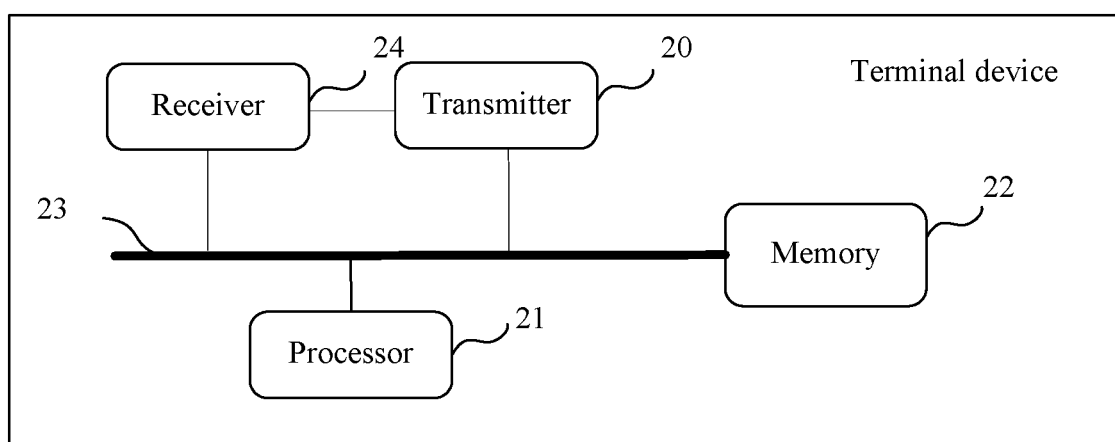
FIG. 5 is a schematic structural diagram of an embodiment of a terminal device according to embodiments of the present disclosure.

FIG. 5 is a schematic structural diagram of an embodiment of a terminal device according to the embodiments of the present disclosure. As shown in FIG. 5, the terminal device may include a transmitter 20, a processor 21, a memory 22, and at least one communications bus 23. The communications bus 23 is configured to implement communication connection between the elements. The memory 22 may include a high-speed RAM 22, and may further include a nonvolatile memory NVM, for example, at least one magnetic disk storage 22. The memory 22 may store various programs to complete various processing functions and implement method steps in this embodiment. The terminal device may further include a receiver 24. The receiver 24 in this embodiment may be an input interface that correspondingly has a communication function and an information receiving function, or may be a radio frequency module or a baseband module on the terminal device. The transmitter 20 in this embodiment may be an output interface that correspondingly has a communication function and an information sending function, or may be a radio frequency module or a baseband module on the terminal device. Optionally, the transmitter 20 and the receiver 24 may be integrated into one communications interface, or may be two independent communications interfaces.

In this embodiment, the receiver 24 is configured to receive a notification message that carries an indication field and that is sent by a base station, where the indication field is used to indicate a transmission type and a transmission parameter of information to be sent by the base station to the terminal device; and at least one state of the indication field indicates that the transmission type is a first multiuser superposition transmission type, and at least one state of the indication field indicates that the transmission type is a third multiuser superposition transmission type; and the processor 21 is configured to obtain, based on a preset correspondence between a value of the indication field and the transmission type and the transmission parameter, the transmission type and the transmission parameter that correspond to the value of the indication field, where the receiver 24 is further configured to receive data based on the transmission type and the transmission parameter.

Optionally, when the transmission type indicated by the indication field is the first multiuser superposition transmission type, the transmission parameter indicated by the indication field includes a power ratio of the terminal device to a paired terminal device.

Optionally, when the transmission type indicated by the indication field is the third multiuser superposition transmission type, the transmission parameter indicated by the indication field includes at least one of a power ratio of the terminal device to a paired terminal device, precoding information of the paired terminal device, and a modulation scheme of the paired terminal device.

The terminal device provided in this embodiment of the present disclosure may perform the foregoing method embodiment. Their implementation principles and technical effects are similar, and details are not described herein again.

It may be clearly understood by persons skilled in the art that, for the purpose of convenient and brief description, division of the foregoing function modules is used as an example for description. During actual application, the foregoing functions may be allocated to and completed by different functional modules according to requirements, that is, the internal structure of the apparatus is divided into different functional modules, to complete all or some of the foregoing described functions. For a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented electrically, mechanically, or in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for message processing, the method comprising:

receiving, by a terminal device included in a multiuser superposition transmission (MUST) system, a notification message carrying an indication field from a base station, wherein the indication field to indicates a transmission type and a transmission parameter of information to be sent from the base station to the terminal device, wherein the transmission type indicated by the indication field is a first multiuser superposition transmission type or a second multiuser superposition transmission type;

obtaining, by the terminal device, based on a correspondence between a value of the indication field and the transmission type and the transmission parameter, the transmission type and the transmission parameter corresponding to the value of the indication field; and receiving, by the terminal device, data based on the transmission type and the transmission parameter.

2. The method according to claim 1, wherein the transmission type indicated by the indication field is the first multiuser superposition transmission type, and the transmission parameter indicated by the indication field comprises a power ratio of the terminal device to a paired terminal device.

3. The method according to claim 2, wherein the power ratio of the terminal device to the paired terminal device comprises a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same.

4. The method according to claim 1, wherein the transmission type indicated by the indication field is the second multiuser superposition transmission type, and the transmission parameter indicated by the indication field comprises at least one of a power ratio of the terminal device to a paired terminal device, precoding information of the paired terminal device, or a modulation scheme of the paired terminal device.

5. A base station, comprising:
a processor; and
a non-transitory computer-readable storage medium coupled to the processor and storing programming instructions for execution by the processor, the programming instructions instruct the processor to:
determine a transmission type of information and a transmission parameter corresponding to the transmission type to be sent to a terminal device; and
send a notification message carrying an indication field to the terminal device, wherein the indication field indicates the transmission type and the transmission parameter, wherein the transmission type indicated by the indication field is a first multiuser superposition transmission type or a second multiuser superposition transmission type.

6. The base station according to claim 5, wherein the transmission type indicated by the indication field is the first multiuser superposition transmission type, and the transmission parameter indicated by the indication field comprises a power ratio of the terminal device to a paired terminal device.

7. The base station according to claim 6, wherein the power ratio of the terminal device to the paired terminal device comprises a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same; and the instructions further include:
not sending signals to the paired terminal device on the second spatial layer.

8. The base station according to claim 5, wherein the transmission type indicated by the indication field is the second multiuser superposition transmission type, and the transmission parameter indicated by the indication field comprises at least one of a power ratio of the terminal device to a paired terminal device, precoding information of the paired terminal device, or a modulation scheme of the paired terminal device.

9. A terminal device, comprising:
a processor; and
a non-transitory computer-readable storage medium coupled to the processor and storing programming instructions for execution by the processor, the programming instructions instruct the processor to:
receive a notification message carrying an indication field from a base station, wherein the indication field indicates a transmission type and a transmission parameter of information to be sent from the base station to the terminal device, wherein the transmission type indicated by the indication field is a first multiuser superposition transmission type or a second multiuser superposition transmission type;
obtain, based on a correspondence between a value of the indication field and the transmission type and the transmission parameter, the transmission type and the transmission parameter corresponding to the value of the indication field; and
receive data based on the transmission type and the transmission parameter.

10. The terminal device according to claim 9, wherein the transmission type indicated by the indication field is the first multiuser superposition transmission type, and the transmission parameter indicated by the indication field comprises a power ratio of the terminal device to a paired terminal device.

11. The terminal device according to claim 10, wherein the power ratio of the terminal device to the paired terminal device comprises a ratio of a power of a first signal sent from the base station to the terminal device on a first spatial layer to a power of a second signal sent from the base station to the paired terminal device on the first spatial layer, wherein powers of signals sent from the base station to the terminal device on the first spatial layer and a second spatial layer are the same.

12. The terminal device according to claim 9, wherein the transmission type indicated by the indication field is the second multiuser superposition transmission type, and the transmission parameter indicated by the indication field comprises at least one of a power ratio of the terminal device to a paired terminal device, precoding information of the paired terminal device, or a modulation scheme of the paired terminal device.

* * * * *